US006618446B1

United States Patent
Nakao (10) Patent No.: US 6,618,446 B1
(45) Date of Patent: Sep. 9, 2003

(54) APPARATUS AND METHOD OF DATA RECONSTRUCTION

(75) Inventor: Hayato Nakao, Yokosuka (JP)

(73) Assignee: Victor Company of Japan, Ltd., Yokohama (JP)

( * ) Notice: Subject to any disclaimer, the term of this patent is extended or adjusted under 35 U.S.C. 154(b) by 0 days.

(21) Appl. No.: 09/449,635

(22) Filed: Nov. 30, 1999

(30) Foreign Application Priority Data

Nov. 30, 1998  (JP) .......................................... 10-340153

(51) Int. Cl.[7] .............................. H04B 1/66; H04N 7/12; H04J 3/24
(52) U.S. Cl. .............................. 375/240.26; 348/409.1; 370/349
(58) Field of Search ...................... 375/240.26, 240.27, 375/240.11, 240.16; 712/200; 348/425.1, 416.1, 432.1, 409, 401; 382/309; 370/412, 349, 522, 535

(56) References Cited

U.S. PATENT DOCUMENTS

| 6,148,121 A | * | 11/2000 | Fujimori et al. ............ 382/309 |
| 6,181,706 B1 | * | 1/2001 | Anderson et al. ........... 370/412 |
| 6,229,801 B1 | * | 5/2001 | Anderson et al. ........... 370/349 |
| 6,310,897 B1 | * | 10/2001 | Watanabe et al. ........... 348/409 |
| 6,435,737 B1 | * | 8/2002 | Wise et al. ................. 712/200 |

FOREIGN PATENT DOCUMENTS

| JP | 09046702 | 2/1997 |
| JP | 09200767 | 7/1997 |

\* cited by examiner

Primary Examiner—Gims S. Philippe
(74) Attorney, Agent, or Firm—Jacobson Holman PLLC (57) ABSTRACT

Original data is reconstructed from an MPEG (Moving Picture Experts Group) bitstream including at least one elementary layer bitstream. The elementary layer bitstream is made of an upper layer bitstream and a plurality of lower layer bitstreams that follow the upper layer bitstream. A start code added to a header of the MPEG bitstream is detected to generate a start code detection signal. Control packets are generated when it is judged, in response to the detection signal, that the detected start code is added to the header of the upper layer bitstream. The control packets carry information on reconstruction of the original data that has been coded into the lower layer bitstreams. The lower layer bitstreams are processed according to the control packets to reconstruct the original data. The start code judgement and the control packet generation are achieved by software. On the other hand, the lower layer bitstream processing is achieved by wired-logic circuitry.

13 Claims, 5 Drawing Sheets

APPARATUS AND METHOD OF DATA RECONSTRUCTION

BACKGROUND OF THE INVENTION

The present invention relates to an apparatus and a method of data reconstruction. Particularly, this invention relates to an apparatus and a method of reconstructing original data from bitstreams, such as MPEG (Moving Picture Experts Group) bitstreams.

MPEG bitstreams are made of system layer bitstreams (PES bitstreams) and elementary layer bitstreams. Each elementary layer bitstream is made of an upper layer bitstream and lower layer bitstreams that follow the upper layer bitstream.

The upper layer bitstream includes data for compensating data errors and synchronization of timing for data decompression that is different according to transfer of MPEG bitstreams via wire or wireless communications or from storage media such as magnetic tapes and discs. On the other hand, the lower layer bitstreams include video data corresponding to a portion of one picture, and audio data.

The upper and lower layer bitstreams are decompressed to obtain original data by means of software or hardware such as wired-logic circuits. Software programs are flexible to any decompression procedures but slow in processing speed. On the other hand, wired-logic circuits process data rapidly but must be re-wired for each decompression procedure.

SUMMARY OF THE INVENTION

A purpose of the present invention is to provide an apparatus and a method of reconstructing data at a high speed and that are flexible to any data reconstructing procedures.

The present invention provides a data reconstruction apparatus that includes a detector, a controller and a processor. An identifier added to a header of an input bitstream is detected by the detector. The input bitstream includes a first bitstream and a plurality of second bitstreams that follow the first bitstream. The detector then generates an identifier detection signal. The controller generates control data based on the first bitstream when the controler judges, in response to the detection signal, that the detected identifier is added to a header of the first bitstream. The control data carry information on reconstruction of original data that has been coded into the second bitstreams. Software for the start code judgement and the control data generation is installed in the controller. The processor, having wired-logic circuitry, processes the second bitstreams according to the wired-logic in response to the control data, thus reconstructing the original data.

Furthermore, the present invention provides a data reconstruction apparatus that includes a detector, a controller and a processor. A start code added to a header of an input MPEG (Moving Picture Experts Group) bitstream is detected by the detector. The MPEG bitstream includes at least one elementary layer bitstream made of an upper layer bitstream and a plurality of lower layer bitstreams that follow the upper layer bitstream. The detector then generates a start code detection signal. The controller generates control packets when the controller judges, in response to the detection signal, that the detected start code is an upper layer start code added to a header of the upper layer bitstream. The control packets carry information on reconstruction of original data that has been coded into the lower layer bitstreams. Software for the start code judgement and the control packet generation is installed in the controller. The processor, having wired-logic circuitry, processes the lower layer bitstreams according to the wired-logic in response to the control packets, thus reconstructing the original data.

Moreover, the present invention provides a data reconstruction apparatus that includes a detector, a controller, a processor and a counter. A start code added to a header of an input MPEG (Moving Picture Experts Group) bitstream is detected by the detecotr. The MPEG bitsream includes a pulrality of system layer bitstreams and elementary layer bitstreams. Each elementary layer bitstream includes an upper layer bitstream and a plurality of lower layer bitstreams that follow the upper layer bitstream. The ststem layer and elementary layer bitstreams are input to the detector in a random order per packet. The detector then generates a start code detection signal. The controller determines, in response to the detection signal, whether the detected start code is added to a header of a firstly input system layer bitstream. The controller further determines whether the system layer bitstream indicates an amount of the elementary layer bitstreams per packet when the detected start code is judged as being added to the header of the firstly input system layer bitstream. The processor processes the lower layer bitstreams according to control packets generated based on the upper layer bitstreams, thus reconstructing original data that has been coded into the lower layer bitstreams. The amount of the elementary layer bitstreams is counted by the counter while the elementary layer bitstreams are input to the detector when the firstly input system layer bitstream is judged as indicating the amount of the elementary layer bitstreams per packet. The controller generates an input inhibit command to the processor so as not to accept the lower layer bitstreams when the counted number reaches a predetermined number.

The present invention also provides a data reconstruction method. A first start code added to a header of an input MPEG bitstream is detected. The input MPEG bitstream includes a pulrality of system layer bitstreams and elementary layer bitstreams. Each elementary layer bitstream includes an upper layer bitstream and a plurality of lower layer bitstreams that follow the upper layer bitstream. The system layer and elementary layer layer bitstreams are input in a random order per packet. A first start code detection signal is generated. It is determined, in response to the first detection signal, whether the detected first start code is added to a header of a firstly input system layer bitstream, and it is determined further whether the system layer bitstream indicates an amount of the elementary layer bitstreams per packet when the detected first start code is judged as being added to the header of the firstly input system layer bitstream. A second start code added to each header of the elementary layer bitstreams is detected to generate a second start code detection signal. Control packets are generated when it is judged, in response to the second detection signal, that the detected second start code is added to a header of the upper layer bitstream. The control packets carry information on reconstruction of original data that has been coded into the lower layer bitstreams. The lower layer bitstreams are processed according to the control packets, thus reconstructing the original data. The amount of the elementary layer bitstreams is counted while the lower layer bitstreams are processed when the firstly input system layer bitstream is judged as indicating the amount of the elementary layer bitstreams per packet, thus inhibiting the processing of the lower layer bitstreams when the counted number reaches a predetermined number.

DETAILED DESCRIPTION OF PREFERRED EMBODIMENTS

Preferred embodiments according to the present invention will be described with reference to the attached drawings.

The present invention focuses on differences between the lower and upper layer bitstreams of layer-structured bitstreams such as MPEG bitstreams. The differences between the lower and upper layer bitstreams are as follows:

The lower layer bitstreams are processed faster than the upper layer bitstreams. This is because the lower layer bitstreams are made of video and/or audio data larger than the upper layer bitstreams. In detail, each lower layer bitstream is updated for every block of, for example, 8×8 pixels of one picture.

On the other hand, the upper layer bitstreams include data for compensating data errors and synchronization of timing for data decompression that is different according to transfer of MPEG bitstreams via wire or wireless communications or from storage media such as magnetic tapes and discs. And, each upper layer bitstream is updated for every picture. The decompression procedure for the upper layer bitstreams will be often revised compared to the lower layer steams.

The present invention achieves high speed data reconstruction that is flexible to any data reconstructing procedure different according to data transfer of bitstreams via wire or wireless communications or from storage media.

For achieving such data reconstruction, the present invention employs software for upper layer bitstream processing and wired-logic circuits for lower layer bitstream processing.

Figure 1:
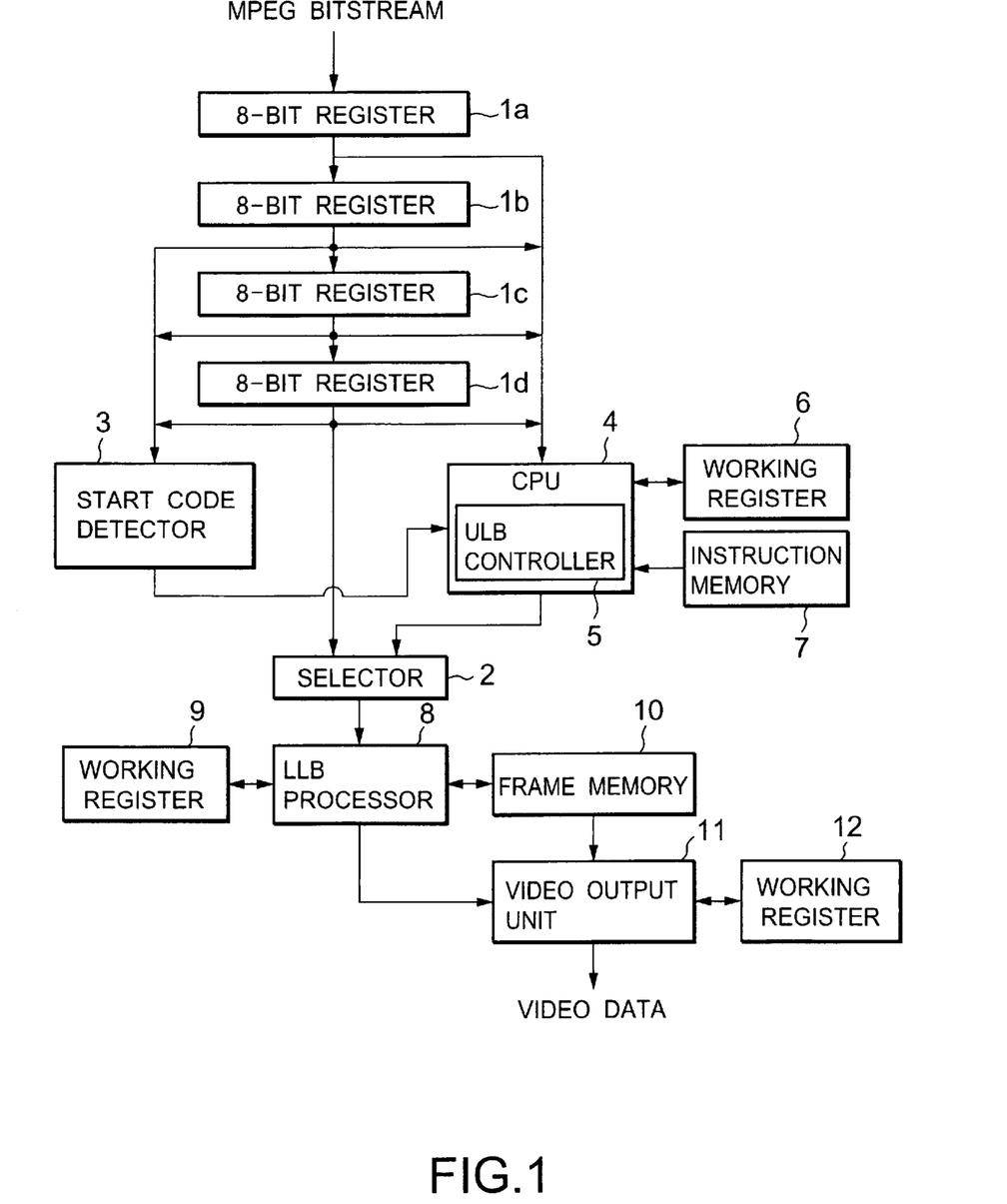
FIG. 1 shows a block diagram of the first preferred embodiment of a data reconstruction apparatus according to the present invention.

Shown in FIG.1 is a block diagram of the first preferred embodiment of a data reconstruction apparatus according to the present invention.

The first embodiment is applicable to process MPEG bitstreams each made of an upper layer bitstream and lower layer bitstrems that follow the upper layer bitstream.

An MPEG bitstream is input to an 8 bit-register $1a$ and shifted through 8-bit registers $1b$ to $1d$, and the output bitstream of the register $1d$ is supplied to a selector 2.

Output data (a portion of the bitstream) of the registers $1a$ to id are supplied to an CPU 4, and the output data of the registers $1b$ to id are also supplied to a start code detector 3. When the input MPEG bitstream is an MPEG video bitstream, a 32-bit start code (identifier) is added to the header of each layer of the MPEG video bitstream. The first 24 bits of the 32 bits construct a constant that indicates the start code. The remaining 8 bits construct data that indicates the upper layer bitstream or the lower layer bitstream.

The start code detector 3 is provided with a comparator. When the detector 3 accepts the bitstream output from the registers $1b$ to $1d$, the comparator compares the bitstream with a preset constant (reference data). When the amount of the bitstream is equal to the preset constant, the detector 3 detects the start code and outputs a start code detection signal.

The bitstream output from the registers $1a$ to $1d$ and the start coded detection signal are supplied to an upper layer bitstream (ULB) controller 5 formed on the CPU 4. Installed in the controller 5 is a software program that executes the process which will be described later with reference to FIG. 2.

The ULB controller 5 reads data (a portion of the bitstream) of the register $1a$ that is input thereto when the detection signal is input thereto, and determines whether the start code detected by the start code detector 3 is an upper layer start code that has been added to the header of the upper layer bitstream or it is a lower layer start code that has been added to each header of the lower layer bitstreams.

When the ULB controller 5 judges that the start code is the upper layer start code, the controller 5 generates control data packets for processing the lower layer bitstreams based on the upper layer bitstream that is supplied from the registers $1a$ to $1d$ next to the start code. The control packets are stored in a working register 6. The control packet generation is performed based on data supplied from an instruction memory 7.

The selector 2 outputs the bitstreams from the registers $1a$ to $1d$ and also the control packets stored in the working register 6 to a lower layer bitstream (LLB) processor 8 in response to an data output command sent from the ULB controller 5. The processor 8 is provided with wired-logic circuits.

The LLB processor 8 supplies the control packets to a working register 9 and also to a working register 12 through a video output unit 11. The processor 8 decompresses the lower layer bitstream to reconstruct video data and stores the video data in predetermined addresses of a frame memory 10 according to first address data carried by the control packets.

The control packets also carry second address data indicating addresses in the frame memory 10 at which video data has already been stored. The video output unit 11 outputs video data read from the frame memory 10 according to the second address data.

Figure 2:
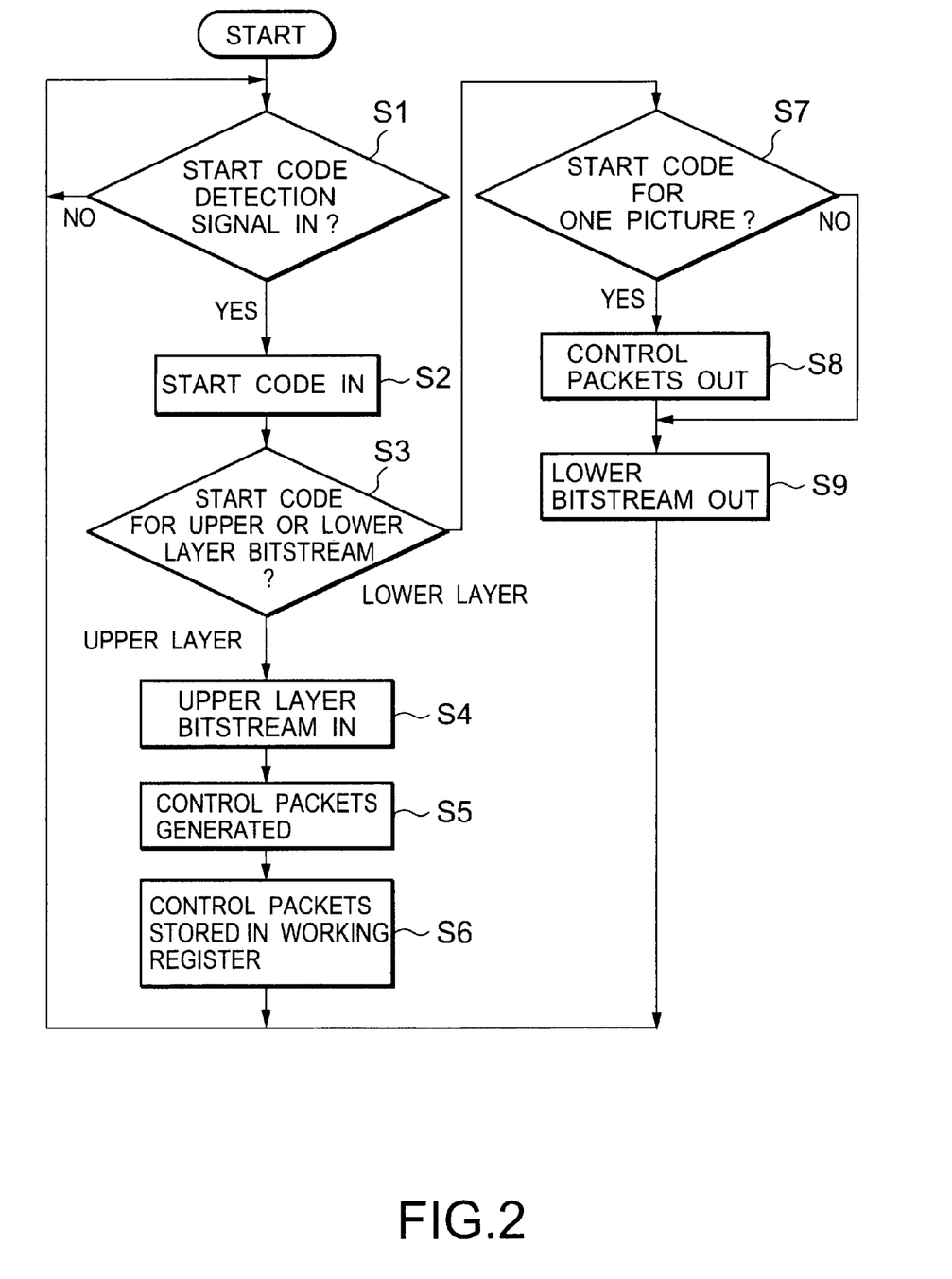
FIG. 2 is a flowchart explaining the functions of the upper layer bitstream controller shown in FIG. 1.

The functions of the ULB controller 5 will be described in detail with respect to the flowchart shown in FIG. 2.

As disclosed above, when the start code detection signal is supplied to the ULB controller 5 from the start code detector 3 in STEP S1, the start code added to the header of the MPEG bitstream is input to the controller 5 in STEP S2.

The ULB controller 5 determines in STEP S3 whether the start code is the upper layer start code that has been added to the header of the upper layer bitstream or it is the lower layer start code that has been added to each header of the lower layer bitstreams. At this stage, the selector 2 is holding the bitstreams supplied from the registers $1a$ to $1d$.

When the ULB controller 5 judges that the start code is the upper layer start code, the controller 5 receives the upper layer bitstream supplied from the registers $1a$ to $1d$ next to the start code in STEP S4.

The ULB controller 5 then generates the control packets based on the upper layer bitstream in STEP S5, and the control packets are stored in the working register 6 in STEP S6.

The process then returns to STEP S1 where the start code detector 3 detects the next start code and outputs a start code detection signal to the ULB controller 5. The next start code added to the header of the bitstream output from the register 1a is input to the controller 5 in STEP S2.

The ULB controller 5 again determines in STEP S3 whether the start code is the code that has been added to the header of the upper layer bitstream or it is the code that has been added to the header of the following lower layer bitstream.

When the ULB controller 5 judges that the start code is the code added to the header of the following lower layer bitstream, the controller 5 further determines in STEP S7 whether the start code is added to the header of video data of one picture carried by the lower layer bitstreams.

If yes, the ULB controller 5 takes the control packets stored in the working register 6 and supplies them to the LLB processor 8 through the selector 2 in STEP S8. The processor 8 stores the control packets in the working register 9 and also in the working register 12 through the video output unit 11.

The ULB controller 5 then sends the data output command to the selector 2, so that the lower layer bitstreams output from the registers 1a to 1d that follow the start code are supplied to the LLB processor 8 in STEP S9. The processor 8 decompresses the lower layer bitstreams to reconstruct video data. The video data are stored in the frame memory 10 at the addresses indicated by the packet data stored in the working register 9. The process returns to STEP S1 where the start code detector 3 detects the next start code.

On the other hand, if not in STEP S7, the lower layer bitstreams output from the registers 1a to 1d are supplied to the LLB processor 8 through the selector 2 for decompression without supply of the control packets stored in the working register 6. This process is performed according to the control packets already stored in the register 9 for reconstruction of pictures for which the past video data already stored in the frame memory 10 are used. The processor 8 reads and writes video data from and to the frame memory 10 for decompression according to the control packets already stored in the working register 9.

Figure 3:
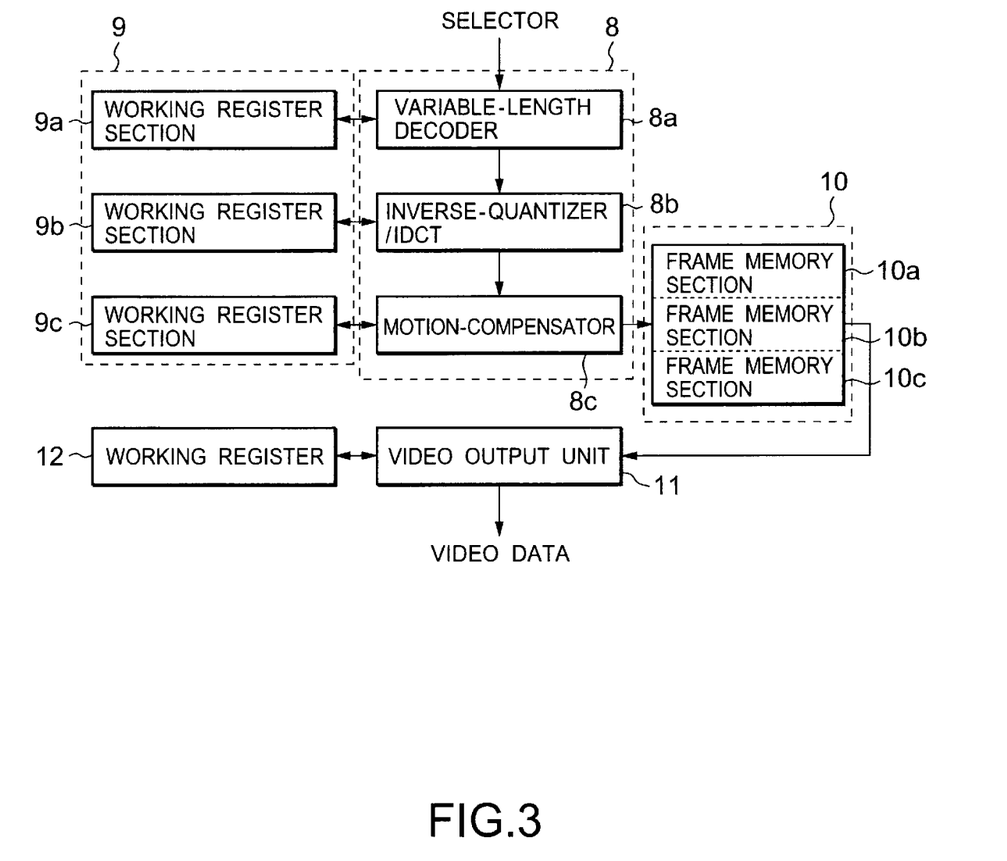
FIG. 3 shows a block diagram of the lower layer bitstream processor shown in FIG. 1.

The decompression of lower layer bitstreams to reconstruct video data by the LLB processor 8 will be described in detail with reference to FIG. 3.

The LLB processor 8 is provided with a motion-compensated decoding section that includes a variable-length decoder 8a, an inverse-quantizer/IDCT (Inverse-Discrete Cosine Transform) 8b and a motion-compensator 8c, all made of wired-logic circuits that define procedures of decoding, inverse-quantizing/IDCT and motion-compensating. The working register 9 is provided with three register sections 9a, 9b and 9c. The register sections are also made of wired-logic circuits. The frame memory 10 is also provided with three memory sections 10a, 10b and 10c. The memory sections are also made of wired-logic circuits. The wired-logic circuits themselves are not shown for brevity but they can be designed according to the number of bits that constitute the input MPEG bitstream.

As already described in FIG. 1, when the data output command is sent to the selector 2 from the ULB controller 5, the lower layer bitstreams output from the registers 1a to 1d are supplied to the LLB processor 8 through the selector 2 with the control packets from the controller 5.

The variable-length decoder 8a takes data necessary for decoding from the control packets and stores the data in the register section 9a. The decoder 8a decodes the lower layer bitstreams according to the data stored in the register section 9a.

The decoded data and the control packets are supplied to the inverse-quantizer/IDCT 8b. The inverse-quantizer/IDCT 8b takes data necessary for inverse-quantizing and IDCT from the control packets and stores the data in the register section 9b. The decoded data is inversely-quantized and IDCTed (transformed by IDCT) according to the data stored in the register section 9b.

The inversely-quantized and IDCTed data and the control packets are supplied to the motion-compensator 8c. The motion-compensator 8c takes data necessary for motion-compensation from the control packets and stores the data in the register section 9c. The inversely-quantized and IDCTed data is motion-compensated according to the data stored in the register section 9c.

The three frame memory sections 10a, 10b and 10c are connected to the motion-compensator 8c. The three memory sections can be accessed by the motion-compensator 8c, but not by the variable-length decoder 8a and the inverse-quantizer/IDCT 8b.

Among the pictures carried by the MPEG lower layer bitstreams processed by the inverse-quantizer/IDCT 8b, I-pictures (intra-coded pictures) that have been coded independently without reference to other pictures do not require motion-compensation. Thus, the inversely-quantized and IDCTed data of I-pictures are stored in the memory section 10a or 10c without motion-compensation.

On the other hand, among the pictures carried by the MPEG lower layer bitstreams processed by the inverse-quantizer/IDCT 8b, P-pictures (predictive-coded pictures) that have been compressed by coding the differences between the P-pictures and reference I- or P-pictures require motion-compensation.

The motion-compensator 8c reads reference I- or P-pictures (which have been motion-compensated) already stored in the memory sections 10a or 10c, and processes the P-pictures output from the inverse-quantizer/IDCT 8b by means of the reference I- or P-pictures. The resultant pictures are stored in the memory section 10a or 10c.

Furthermore, among the pictures carried by the MPEG lower layer bitstreams processed by the inverse-quantizer/IDCT 8b, B-pictures (bidirectionally predictive-coded pictures) that have been compressed by coding the differences between the B-pictures and reference I- or P-pictures require motion-compensation.

The motion-compensator 8c reads preceding and/or upcoming reference I- or P-pictures already stored in the memory sections 10a or 10c, and processes the B-pictures output from the inverse-quantizer/IDCT 8b by means of the reference I- or P-pictures. The resultant pictures are stored in the memory section 10b.

The lower layer bitstreams decompressed by the LLB processor 8 are supplied to the video output unit 11 and the reconstructed video data is output therefrom according to the address data stored in the working register 12.

According to the first embodiment, the apparatus shown in FIG. 1 is provided with an upper layer bitstream controller formed on a CPU and a lower layer bitstream processor. The software program for processing upper layer streams which will be often revised is installed in the upper layer bitstream controller. On the other hand, decompression of lower layer bitstreams that requires high processing speed is achieved by hardware, that is wired-logic circuits formed on the lower layer bitstream processor. The present invention thus achieves data reconstruction at a high processing speed and that is flexible for any data reconstructing procedures.

Figure 4:
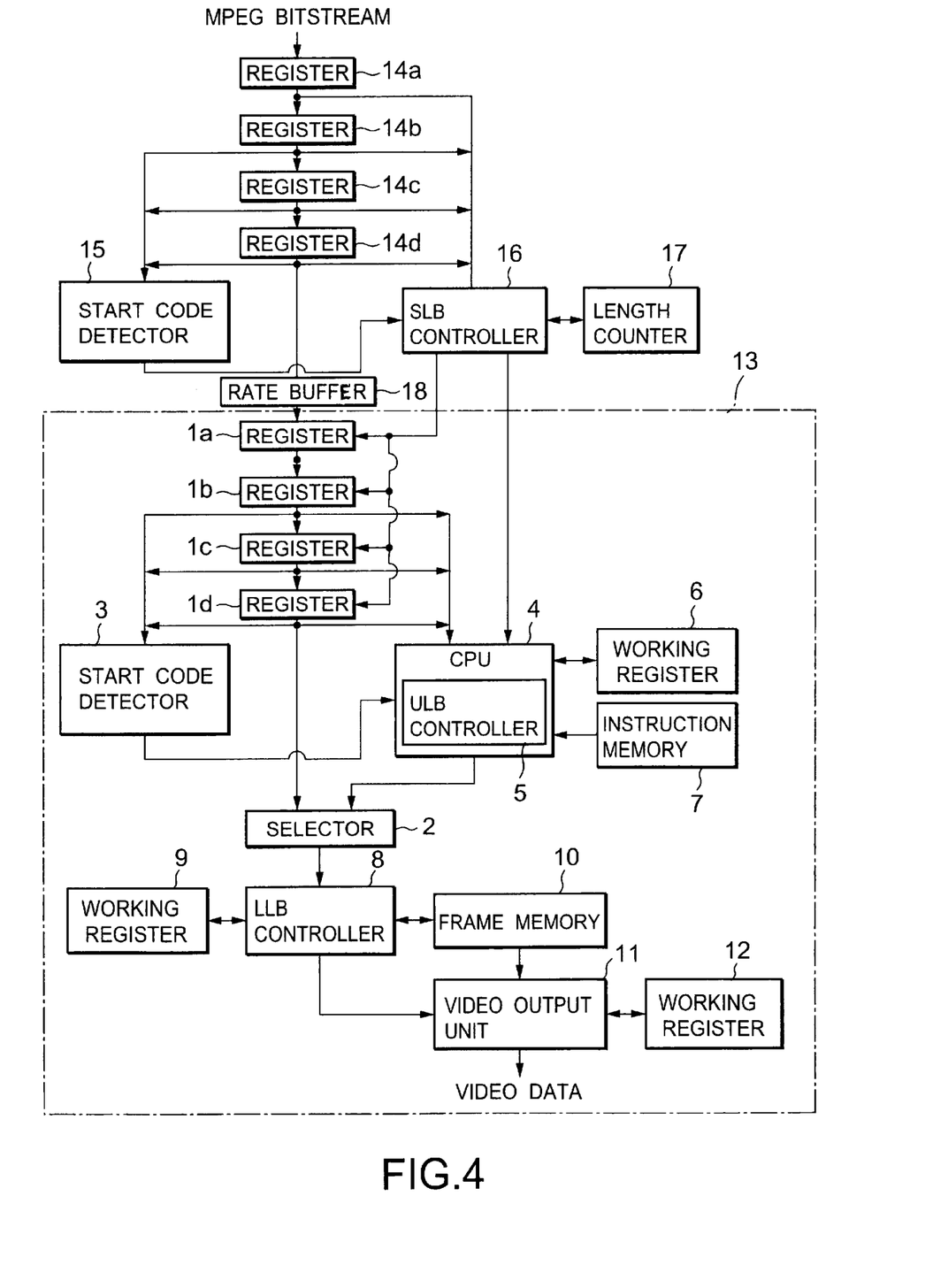
FIG. 4 shows a block diagram of the second preferred embodiment of a data reconstruction apparatus according to the present invention.

Shown in FIG. 4 is a block diagram of the second preferred embodiment of a data reconstruction apparatus according to the present invention. Elements in the second embodiment that are the same as or analogous to elements in the first embodiment are referenced by the same reference numerals and will not be explained in detail.

The second embodiment is preferable to MPEG bitstream processing where system layer bitstreams and elementary layer bitstreams are input in a random order per packet.

The data reconstruction apparatus shown in FIG. 4 is provided with an elementary layer bitstream processor 13 that is identical to the apparatus shown in FIG. 1.

In FIG. 4, an MPEG bitstream is input to a register 14a and shifted through registers 14b to 14d.

Output data (a portion of the bitstreams) of the registers 14a to 14d are supplied to a system layer bitstream (SLB) controller 16, and the output data of the registers 14b to 14d are also supplied to a start code detector 15.

The start code detector 15 is provided with a comparator. When the detector 15 accepts the data each output from the registers 14a to 14d, the comparator compares the data with a preset constant. The detector 15 detects the start code and outputs a start code detection signal when any one of the data is equal to the preset constant.

The start code detection signal is supplied to the SLB controller 16. The controller 16 reads the data of the register 14a that is input thereto when the detection signal is input thereto, and determines whether the start code detected by the start code detector 15 is a system layer start code that has been added to the header of the firstly input system layer bitstream or it is an elementary layer start code that has been added to each header of the elementary layer bitstreams that follow the firstly input system layer bitstream in one packet.

When the SLB controller 16 judges that the start code is the system layer start code, the controller 16 outputs a specific data of the system layer bitstream that follows the start code, such as a time stamp, to the ULB controller 5 of the elementary layer bitstream processor 13.

When the system layer bitstream indicates the amount of the elementary layer bitstreams in one packet, the SLB controller 16 reads the amount of the elementary layer bitstreams from the system layer bitstream and stores it in a length counter 17. The number counted by the counter 17 is decremented whenever the elementary layer bitstreams are shifted or sent from the registers 14a to 14d to the registers 1a to 1d of the elementary layer bitstream processor 13 through a rate buffer 18. When the counted number reaches zero (a reference number), the SLB controller 16 sends a data input inhibit command to the registers 1a to 1d so as not to accept the bitstream (system layer bitstream) from the rate buffer 18.

The rate buffer 18 adjusts the bit rate of the bitstreams sent from the registers 14a to 14d so that the bitstreams are accurately processed by the elementary layer bitstream processor 13. This is because the bit rate of the bitstreams shifted or sent through the registers 14a to 14d is constant for detection of the time stamp; on the other hand, it is understood from the explanation with reference to FIG. 3 that the bit rates of the I-, P- and B-pictures of the elementary layer bitstreams are different from each other. Therefore, the constant bit rate of the elementary layer bitstreams supplied to the registers 1a to 1d must be adjusted according to the difference in bit rate of the I-, P- and B-pictures.

When the amount of the elementary layer bitstreams is not indicated by the system layer bitstream, this means that the end of the elementary layer bitstreams that follow the system layer bitstream is located just before the start code for the system layer bitstream. Then, the start code detector 15 determines whether the amount of the bitstreams from the registers 14b to 14d is equal to a present constant (reference data) whenever the elementary layer bitstreams are shifted or sent from the registers 14a to 14d to the registers 1a to 1d. A start code detection signal is generated by the detector 15 when the amount of the input bitstreams are equal to the present constant and supplied to the SLB controller 16.

The SLB controller 16 reads the data (a portion of the bitstreams) of the register 14a that is input thereto when the start code detection signal is input thereto. The controller 16 then judges that the detected start code is added to the header of the system layer bitstream and sends a data input inhibit command to the registers 1a to 1d so as not to accept the bitstream (system layer bitstream) from the registers 14a to 14d.

Figure 5:
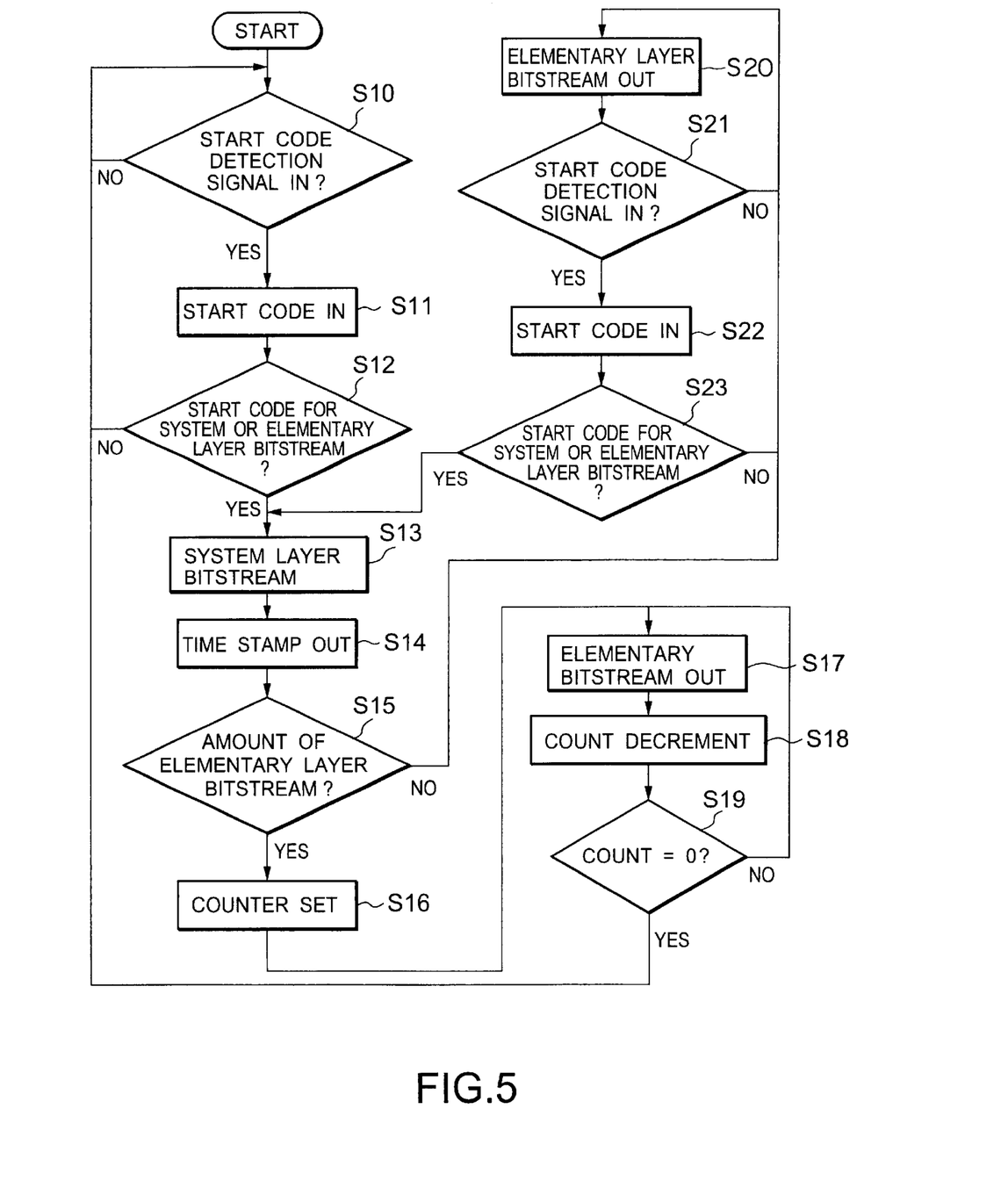
FIG. 5 is a flowchart explaining the functions of the system layer bitstream controller shown in FIG. 4.

The functions of the SLB controller 16 will be described in detail with respect to the flowchart shown in FIG. 5.

As disclosed above, when the start code detector 15 accepts the data each output from the registers 14b to 14d in one packet, the comparator compares the data with the preset constant and outputs the start code detection signal when any one of the data is equal to the preset constant.

The start code detection signal is then supplied to the SLB controller 16 in STEP S10. The controller 16 reads the data of the register 14a that is input thereto when the detection signal is input thereto in STEP S11, and determines in STEP S12 whether the start code detected by the start code detector 15 is the system layer start code that has been added to the header of the firstly input system layer bitstream or it is the elementary layer start code that has been added to each header of the elementary layer bitstreams that follow the firstly input system layer bitstream in one packet.

When the SLB controller 16 judges in STEP S12 that the start code is the system layer start code, the controller 16 outputs a specific data of the system layer bitstream that follows (STEP S13) the start code, such as a time stamp, to the ULB controller 5 of the elementary layer bitstream processor 13 in STEP S14.

When the system layer bitstream indicates the amount of the elementary layer bitstreams in one packet in STEP S15, the SLB controller 16 reads the amount of the elementary layer bitstreams from the system layer bitstream and stores it in the length counter 17 in STEP S16.

When the input of the system layer bitstream to the SLB controller 16 (STEP S13) completes, the elementary layer bitstreams are advanced to the registers 14a to 14d. The elementary layer bitstreams are then shifted or sent from the registers 14a to 14d to the registers 1a to 1d of the elementary layer bitstream processor 13 in STEP S17.

The number counted by the length counter 17 is decremented in STEP S18 while the elementary layer bitstreams are sent to the registers 1a to 1d. When the counted number reaches zero in STEP S19, the SLB controller 16 sends the data input inhibit command to the registers 1a to 1d so as not to accept the bitstream from the registers 14a to 14d. Thus, other system layer bitstreams existed in the same packet are inhibited from being input to the registers 1a to 1d.

The process from STEPs S17 to S19 are repeated until the input of the elementary layer bitstreams to the registers 1a to 1d completes for one packet. And, the process returns to STEP S10 for the next packet.

In the same way as disclosed above, the system layer bitstream for the next packet is input to the SLB controller 16 in STEP S13 after detection of the start code for the system layer bitstream. When the system layer bitstream indicates the amount of the elementary layer bitstreams for the next packet, the amount is stored in the length counter 17 in STEP S16. The SLB controller 16 then stops the supply of the data input inhibit command so that elementary layer bitstreams are sent to the registers 1a to 1d.

Accordingly, since the system layer bitstreams are supplied to the SLB controller 16, the elementary layer bitstreams are successively input to the registers 1a to 1d without interruption by the system layer bitstreams.

On the other hand, in STEP S15, when the amount of the elementary layer bitstreams is not indicated by the system layer bitstream, the elementary layer bitstreams are shifted or sent from the registers 14a to 14d to the registers 1a to 1d in STEP S20.

The start code detector 15 determines whether the amount of the bitstreams from the registers 14a to 14d are equal to the present constant whenever the elementary layer bitstreams are shifted or sent from the registers 14a to 14d to the registers 1a to 1d. The detector 15 detects a start code and generates a start code detection signal when the amount of the input bitstreams are equal to the present constant. The detection signal is then supplied to the SLB controller 16 in STEP S21.

The SLB controller 16 reads the data of the register 14a that is input thereto when the start code detection signal is input thereto in STEP S22. When the controller 16 judges in STEP S23 that the detected start code is added to the system layer bitstream, the controller 16 sends a data input inhibit command to the registers 1a to 1d so as not to accept the bitstream (system layer bitstream) from the registers 14a to 14d.

The process then goes to STEP S13. On the other hand, when the start code is judged as being added to the elementary layer bitstreams, the process returns to STEP S20.

As disclosed above, according to the second embodiment, even though system and elementary layer bitstreams are input to the data reconstruction apparatus of FIG. 4 in a random order per packet, the elementary layer bitstreams are successively input to the registers 1a to 1d without interruption by the system layer bitstreams for accurate data reconstruction.

In FIG. 4, the SLB controller 16 can be formed on one chip CPU with the ULB controller 5. A software program that executes the process shown in FIG. 5 can be installed in the controller 16.

As disclosed above, according to the present invention, the upper layer bitstream processing which will be often revised is achieved by software; on the other hand, decompression of lower layer bitstreams that requires high processing speed is achieved by hardware, that is, wired-logic circuitry. The present invention thus achieves data reconstruction at a high processing speed and that is flexible to any data reconstructing procedures.

Furthermore, according to the present invention, the elementary layer bitstreams are successively decompressed for original data reconstruction without interruption by the system layer bitstreams even though the system and elementary layer bitstreams are input in a random order per packet.

What is claimed is:

1. A data reconstruction apparatus comprising:
    a first detector to detect a first start code added to a header of an input first MPEG (Moving Picture Experts Group) bitstream including at least one elementary layer bitstream made of an upper layer bitstream and a plurality of lower layer bitstreams that follow the upper layer bitstream, thus generating a first start code detection signal;
    a first controller to generate control packets when the first controller judges, in response to the first detection signal, that the detected first start code is an upper layer start code added to a header of the upper layer bitstream, the control packets carrying information on reconstruction of original data that has been coded into the lower layer bitstreams, software for the start code judgement and the control packet generation being installed in the first controller;
    a processor, having wired-logic circuitry, to process the lower layer bitstreams according to the wired-logic in response to the control packets, thus reconstructing the original data,
    wherein when the detected first start code is judged as a lower layer start code added to each header of the lower layer bitstreams that follow the upper layer bitstream, the processor processes the lower layer bitstreams in response to control packets already generated by the first controller; and
    wherein only the lower layer bitstreams are transferred to the processor when the first controller further judges that the detected first start code is not added to a header of video data of one picture carried by the lower layer bitstreams.

2. The apparatus according to claim 1, further comprising a selector to pass the control packets and the lower layer bitstreams to the processor when the detected first start code is judged as the upper layer start code.

3. The apparatus according to claim 1, wherein the first controller accepts data of the input register when the first detection signal is input to the first controller and determines whether the first detected start code is the upper layer start code.

4. The apparatus according to claim 1, wherein the already generated control packets and the lower layer bitstreams are transferred to the processor when the first controller further judges that the detected first start code is added to a header of video data of one picture carried by the lower layer bitstreams.

5. A data reconstruction apparatus comprising:
    a first detector to detect a first start code added to a header of an input first MPEG (Moving Picture Experts Group) bitstream including at least one elementary layer bitstream made of an upper layer bitstream and a plurality of lower layer bitstreams that follow the upper layer bitstream, thus generating a first start code detection signal;
    a first controller to generate control packets when the first controller judges, in response to the first detection signal, that the detected first start code is an upper layer start code added to a header of the upper layer bitstream, the control packets carrying information on reconstruction of original data that has been coded into the lower layer bitstreams, software for the start code judgement and the control packet generation being installed in the first controller;
    a processor, having wired-logic circuitry, to process the lower layer bitstreams according to the wired-logic in response to the control packets, thus reconstructing the original data; and
    the processor includes a motion-compensated decoding section having frame memories, the decoding section decompressing the lower layer bitstreams to reconstruct the original data with motion-compensation by writing and reading decompressed frame pictures carried by the lower layer bitstreams to and from the frame memories.

6. A data reconstruction apparatus comprising:

a first detector to detect a first start code added to a header of an input first MPEG (Moving Picture Experts Group) bitstream including at least one elementary layer bitstream made of an upper layer bitstream and a plurality of lower layer bitstreams that follow the upper layer bitstream, thus generating a first start code detection signal;

a first controller to generate control packets when the first controller judges, in response to the first detection signal, that the detected first start code is an upper layer start code added to a header of the upper layer bitstream, the control packets carrying information on reconstruction of original data that has been coded into the lower layer bitstreams, software for the start code judgement and the control packet generation being installed in the first controller;

a processor, having wired-logic circuitry, to process the lower layer bitstreams according to the wired-logic in response to the control packets, thus reconstructing the original data;

a plurality of registers connected in series and having an input register and an output register, through which the input MPEG bitstream is shifted, the first detector generating the detection signal when the input MPEG bitstream being shifted through the registers is equal to reference data;

a second detector to detect a second start code added to a header of a second MPEG bitstream including a plurality of system layer bitstreams and elementary layer bitstreams, the system layer and elementary layer bitstreams being input to the second detector in a random order per packet, thus generating a second start code detection signal;

a second controller to determine, in response to the second detection signal, whether the detected second start code is added to a header of a firstly input system layer bitstream, the controller further determining whether the system layer bitstream indicates an amount of the elementary layer bitstreams per packet when the detected second start code is judged as added to the header of the firstly input system layer bitstream; and a counter to count the amount of the elementary layer bitstreams while the elementary layer bitstreams are input to the first detector when the firstly input system layer bitstream is judged as indicating the amount of the elementary layer bitstreams per packet, the second controller generating an input inhibit command to the registers so as not to accept the bitstream when the counted number reaches a predetermined number.

7. The apparatus according to claim 6, wherein when the system layer bitstream is not judged as indicating the amount of the elementary layer bitstreams per packet, the second controller generates an input inhibit command to the registers so as not to accept the bitstream if the second MPEG bitstream is equal to reference data while the elementary layer bitstreams are input to the first detector.

8. The apparatus according to claim 6, wherein software for determination of the second start code as the header of the firstly input system layer bitstream, determination of the system layer bitstream as indicating the amount of the elemetary bitstreams and generation of the input inhibit command are installed in the second controller.

9. A data reconstruction apparatus comprising:

a detector to detect a start code added to a header of an input MPEG (Moving Picture Experts Group) bitstream including a plurality of system layer bitstreams and elementary layer bitstreams, each elementary layer bitstream including an upper layer bitstream and a plurality of lower layer bitstreams that follow the upper layer bitstream, the system layer and elementary layer bitstreams being input to the detector in a random order per packet, thus generating a start code detection signal;

a controller to determine, in response to the detection signal, whether the detected start code is added to a header of a firstly input system layer bitstream, the controller further determining whether the system layer bitstream indicates an amount of the elementary layer bitstreams per packet when the detected start code is judged as added to the header of the firstly input system layer bitstream;

a processor to process the lower layer bitstreams according to control packets generated based on the upper layer bitstreams, thus reconstructing original data that has been coded into the lower layer bitstreams; and a counter to count the amount of the elementary layer bitstreams while the elementary layer bitstreams are input to the detector when the firstly input system layer bitstream is judged as indicating the amount of the elementary layer bitstreams per packet, the controller generating an input inhibit command to the processor so as not to accept the lower layer bitstreams when the counted number reaches a predetermined number.

10. The apparatus according to claim 6, wherein when the system layer bitstream is not judged as indicating the amount of the elementary layer bitstreams per packet, the controller generates an input inhibit command to the processor so as not to accept the lower layer bitstreams if the MPEG bitstream is equal to reference data while the elementary layer bitstreams are input to the detector.

11. The apparatus according to claim 6 further comprising a rate buffer to adjust a bit rate of the lower layer bitstreams of the input MPEG bitstream so that pictures carried by the lower layer bitstreams are reconstructed by the processor according to the control packets carrying information on reconstruction of the pictures.

12. A data reconstruction method comprising the steps of:

detecting a first start code added to a header of an input MPEG bitstream including a plurality of system layer bitstreams and elementary layer bitstreams, each elementary layer bitstream including an upper layer bitstream and a plurality of lower layer bitstreams that follow the upper layer bitstream, the system layer and elementary layer bitstreams being input in a random order per packet and generating a first start code detection signal;

determining, in response to the first detection signal, whether the detected first start code is added to a header of a firstly input system layer bitstream, and determining further whether the system layer bitstream indicates an amount of the elementary layer bitstreams per packet when the detected first start code is judged as being added to the header of the firstly input system layer bitstream;

detecting a second start code added to each header of the elementary layer bitstreams, thus generating a second start code detection signal;

generating control packets when it is judged, in response to the second detection signal, that the detected second start code is added to a header of the upper layer bitstream, the control packets carrying information on reconstruction of original data that has been coded into the lower layer bitstreams;

processing the lower layer bitstreams according to the control packets, thus reconstructing the original data; and counting the amount of the elementary layer bitstreams while the lower layer bitstreams are processed when the firstly input system layer bitstream is judged as indicating the amount of the elementary layer bitstreams per packet, thus inhabiting the processing of the lower layer bitstreams when the counted number reaches a predetermined number.

13. The method according to claim 12 further comprising the step of, wherein when the firstly input system layer bitstream is not judged as indicating the amount of the elementary layer bitstreams per packet, inhibiting the processing of the lower layer bitstreams when the MPEG bitstream is equal to reference data during the input of the elementary layer bitstreams.

* * * * *